Feb. 25, 1958
E. C. GROVES
2,824,470
BORING MACHINE
Filed Feb. 1, 1954
3 Sheets-Sheet 1
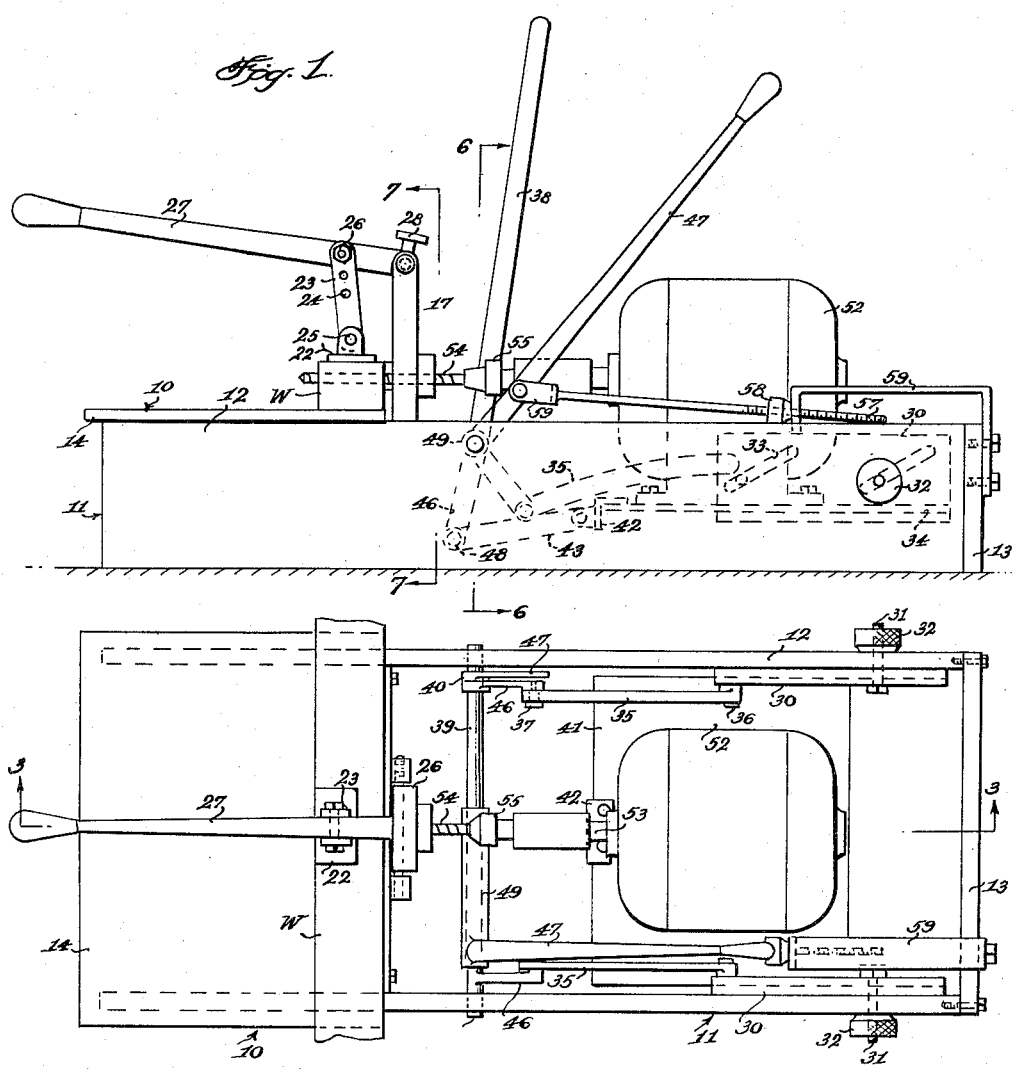
E. C. GROVES INVENTOR
BY *Snow Leo.*
ATTORNEYS.

Feb. 25, 1958   E. C. GROVES   2,824,470
BORING MACHINE

Filed Feb. 1, 1954   3 Sheets-Sheet 2

E. C. GROVES   INVENTOR
BY   ATTORNEYS.

Feb. 25, 1958

E. C. GROVES 2,824,470

BORING MACHINE

Filed Feb. 1, 1954

E. C. GROVES INVENTOR

BY C. A. Snow & Co.

ATTORNEYS.

United States Patent Office 2,824,470
Patented Feb. 25, 1958

2,824,470

BORING MACHINE

Earl C. Groves, Monett, Mo.; E. L. Monroe, administrator of said Earl C. Groves, deceased Application February 1, 1954, Serial No. 407,304

2 Claims. (Cl. 77—5)

This invention relates to an improved boring machine and more particularly to a boring machine which is vertically adjustable relative to the work piece to be bored and manually movable in a guide track while being manually positioned in boring engagement with the work piece.

It is a principal object of this invention to provide a boring tool of the kind to be more particularly described hereinafter for boring a work piece wherein the work piece may be of such size and weight that it can be clamped to a work bench while it is being bored and the boring tool and motor are slidably supported adjacent the bench while the tool is being moved both horizontally and vertically to its operative position into engagement with the work.

A further object of this invention is to provide a boring machine of this kind having a manually actuated lever clamping means for the work piece to be bored and a manually actuated lever means for adjusting the vertical position of the boring tool being slid longitudinally of the machine into its boring engagement with the work piece.

It is another object of this invention to provide an improved boring tool of this kind actuatable by three levers which may be individually actuated by a person using the boring machine.

Other and further objects and advantages of the invention will be hereinafter described and the novel features thereof defined in the appended claims.

In the drawings:

Fig. 1 is a side elevation of an improved boring machine constructed according to an embodiment of my invention.

Fig. 2 is a top plan view.

Figure 3:
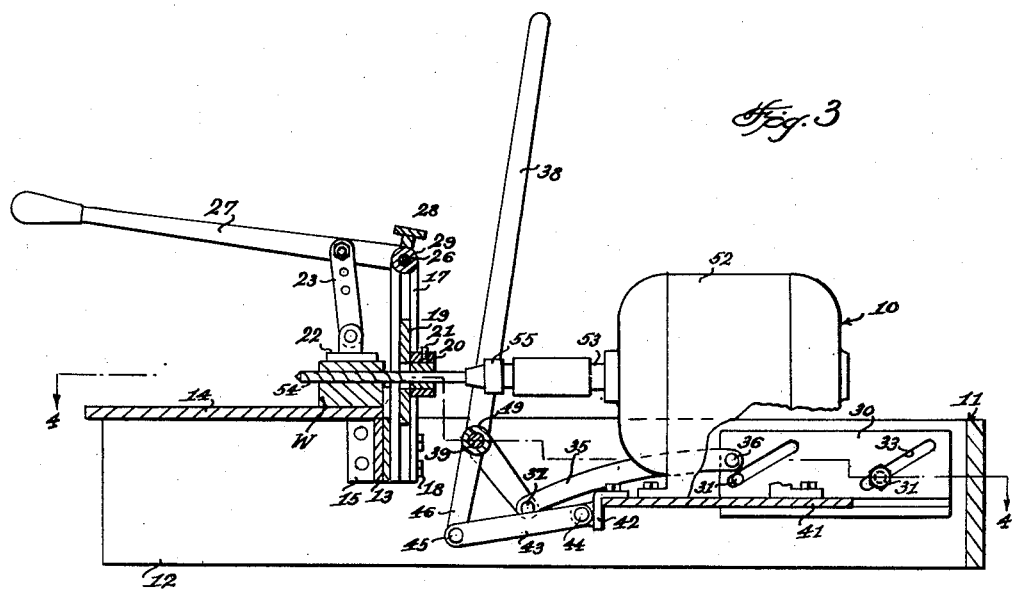
Fig. 3 is a longitudinal section taken substantially on the line 3—3 of Fig. 2.
Figure 4:
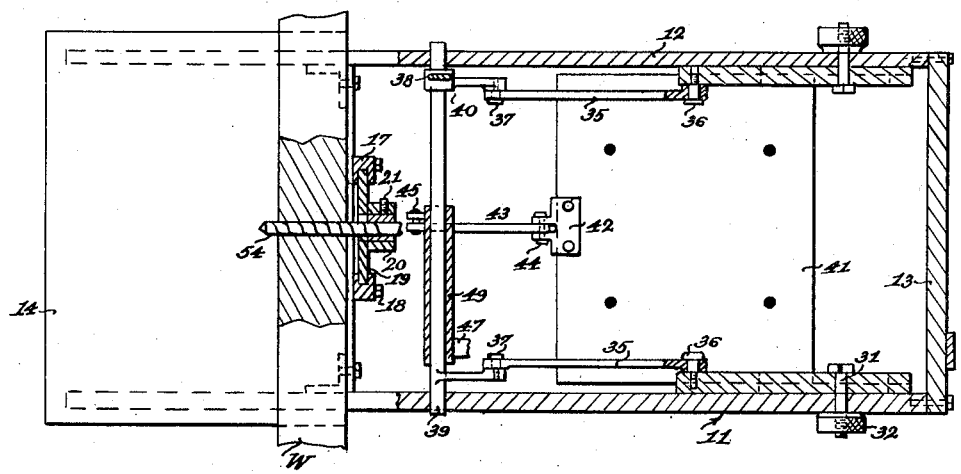
Fig. 4 is a longitudinal section taken substantially on the line 4—4 of Fig. 3.
Figure 5:
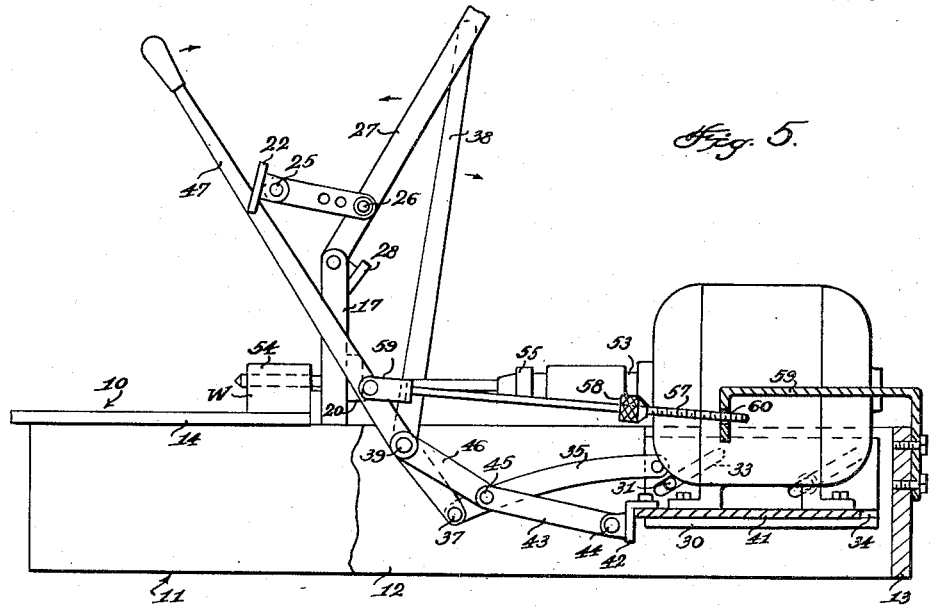
Fig. 5 is a side elevation, partly broken away with the broken away portion in section.
Figure 7:
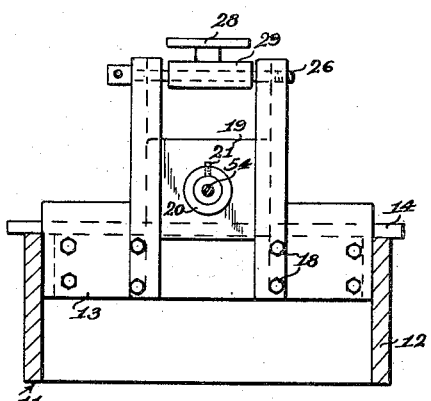
Fig. 7 is a transverse section taken on the line 7—7 of Fig. 1.
Figure 6:
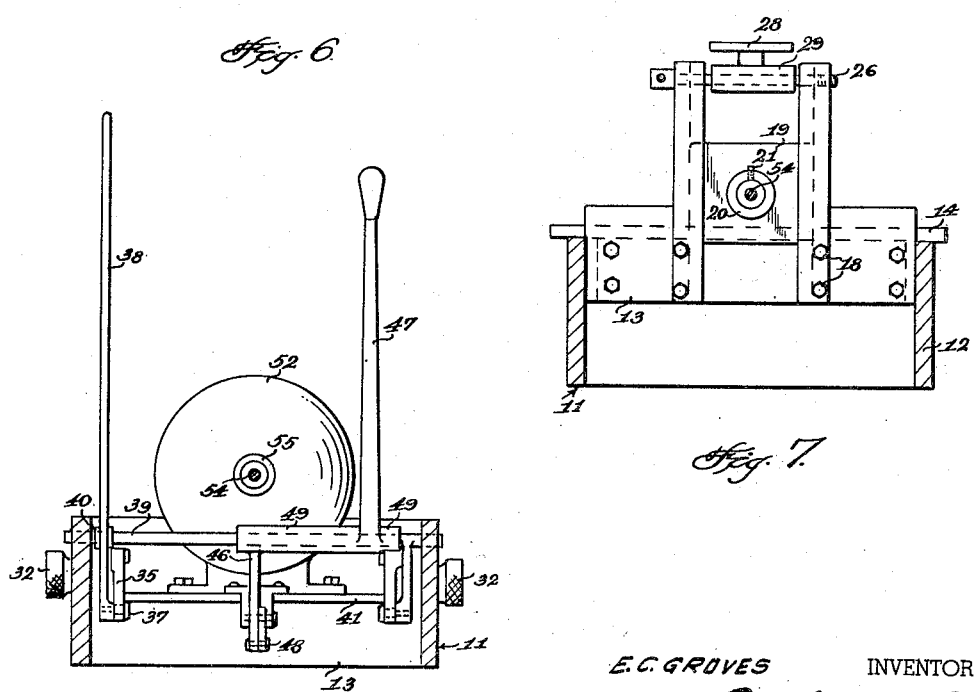
Fig. 6 is a transverse section taken on the line 6—6 of Fig. 1.

Referring more specifically to the drawings, the numeral 10 designates generally an improved boring machine constructed according to an embodiment of my invention.

The improved boring machine 10 is provided with a rectangular metal frame 11 having side bars 12 and transverse bars 13, some of which are positioned at the opposite ends of said bars 12. A bench top or table top 14 is secured on the upper side of the flat frame 11 extending over an end portion thereof, the bench top 14 being secured to the frame 11 by a bracket 15 which is bolted to an intermediate transverse bar 13, intermediate the length of the frame 11.

On the spaced side of the frame secured to the bracket 15 there are a pair of transversely spaced apart upwardly extending U-shaped channel guide members 17 which are bolted, with bolts 18, to the bracket 15 as clearly shown in Fig. 3 of the drawings. The bolts 18 also secure the U-shaped channel guide members 17 to the intermediate transverse frame bar 13.

A bushing plate 19 is slidably supported between the confronting U-shaped portions of the channel guide members 17 and provided with a hole 19' intermediate the length and width thereof for the purposes to be more specifically described hereinafter.

A boring tool guide bushing 20 is secured to one side of the bushing plate 19 having a transversely extending set screw 21 supported therein for centering the boring tool when engaged through the guide bushing 20.

A clamping jaw 22 is provided for clampingly engaging one side of the top of the work piece W placed on the bench top 14, the clamping jaw 22 being pivotally mounted on the lower end of a pair of clamp arms 23 which have a series of adjacent openings 24 therethrough for adjusting the setting of the clamping jaw to suit the size of the work piece W to be bored. The clamping jaw 22 is swingably mounted on an end of the clamp arms 23 by a pivot pin 25 which engages through the pivot supporting members on the clamping jaw and through an end of the clamp arms 23.

At one end of each of the clamp arms 23 there is provided a pivot 26 which engages through selected aligned openings 24 of the clamp arms 23 and with a clamp lever 27.

A stop bar 28 is formed on the clamp lever 27 extending and spaced from, while being in alignment with, the pivot 26 for the clamp lever and engageable with the outer side of the vertically extending channel guide members 17 when the clamp lever 27 is raised to its extreme position out of clamping engagement with the work piece W.

The clamp lever 27 is formed integral with a pivot sleeve 29 which encloses the pivot pin 26 to provide a relatively wide bearing surface for the pivot of the lever 27 before, during and after its use for clamping the work piece W onto the bench top 14.

Within the frame 11 and at the opposite ends thereof remote from the bench top 14 there are provided a pair of flat motor support plates 30 which are mounted on a pair of laterally extending inwardly protruding pins 31 on the side bars 12, the longitudinally outermost pair of pins 31 extending outwardly through the side bars 12 where the threaded end of the pins 31 is threadably engaged with a nut 32. Both of the pins 31 on each side of the frame 11 extend through an inclined slot 33 in the respective motor plate support members 30 and the nut on the outermost of the pins 31 is enlarged, being provided with a knurled peripheral edge, for the engagement of the fingers of a user of the boring machine 10 to secure the motor plate supports 30 in their desired position.

The motor plate supports 30 are elongated and rather wide, the lower ends of each of which being provided with a longitudinally extending groove 34 within which the motor plate is adapted to be moved during its use in the use and operation of the boring machine 10.

A longitudinally extending flat bar 35 is pivotally mounted on each of the motor supporting plates 30, extending interiorly of the frame 11 on which an end of the flat bar 35 is pivotally mounted.

The pivotal connection between each of the motor plate supports 30 and the bars 35 is by way of the pivot pin 36, there being a pivot pin 37 which pivotally connects the bar 35 to the end of the adjusting lever 38. The vertically extending lever 38 is fixed, intermediate the length thereof, on a cross shaft 39 having a hub 40 in which the cross shaft 39 is adapted to be extended to afford the rotatable movement of the lever 38. The lower end of the lever 38 is extended on the opposite sides of the boring machine 10, at the opposite ends of the shaft 37, as lever arms 46 for connection to the bars 35 and thereby to both of the motor plates 30.

A motor plate 41 is slidably supported at the opposite ends thereof in the longitudinal grooves 34 of the motor plate supports 30 described above.

In order to accomplish the sliding movement of the motor plate 41 there is provided a bracket 42 fixed intermediate the width of the motor plate and to which is pivotally connected a link 43 also pivotally connected to the ends of the depending lever 46 fixed at one end to one end of the sleeve 49 by which the longitudinally movable plate 41 may be moved by an operator actuating lever 47 which extends outwardly from the boring machine 10.

A pivot pin 44 extends through the bracket 42 and through an end of the link 43, the other end of the link 43 being pivotally connected by a pivot pin 45 and the lower arm 46 of the lever 47 and fixedly secured at one end to the sleeve 49, the other end of the lever extending upwardly from the boring machine to be actuated by an operator.

A pivot pin 48 is carried by the lower end of the lever arm 46 for the pivotal connection with the other end of the link 43 whereby the longitudinal movement of the motor plate 41 is effected upon rocking of the lever 47 about the cross shaft 39.

The upwardly extending lever 47 is fixedly secured to the transversely extending sleeve 49 which in turn is rotatable about the cross shaft 39, the sleeve 49 also having the downwardly extending arms 46 secured thereto.

A motor 52 is mounted on the motor plate 41 having a rotatable motor shaft 53 extending outwardly from one side thereof and a boring tool 54 secured to the motor shaft 53 as clearly indicated in the drawings.

The boring tool 54 is removably engaged at one end in the chuck 55 secured on one end of the motor shaft 53 so that the boring tool 54 may be inserted into the chuck or moved therefrom at the will of the operator.

Also at this other end of the boring machine 10, remote from the bench 14, there is provided a substantially inverted L-shaped bracket 56 through which a threaded shaft 57 is adapted to be engaged, the threaded shaft 57 having secured thereto a depth gauge 58, intermediate the length thereof, there being a U-shaped yoke 59 which is pivotally connected to the lever 47 so that the depth of the bore being formed in the work piece W may be substantially judged and adjusted before the operation is commenced.

The threaded shaft 57, outwardly from the depth gauge 58, is slidably disposed for movement through a stop hole 60 in the bracket 59 so that the depth gauge may be free for movement during the boring operation of the boring machine.

In the use and operation of the boring machine 10 a work piece W to be bored is initially clamped on the work bench 14 by proper pivotal movement of the lever 27. The tool guide bushing 20 is then slid to a position in alignment with the point where the bore is to be made by sliding the bushing plate 19 vertically in the channel guide 17.

Next the motor supports 30 are manually moved to a selected vertical position by the engagement of the pins 31 in the slot 33 with the nut 32 loosened. The nuts 32 are threaded into tightening position on their respective pins 31 to secure the supports in their selected vertical position. The movement of the supports 30 is accomplished by the manual pivoting of the lever 38 on one end of the cross shaft 39.

Then the motor plate 41, bearing the motor 52 and the boring tool or bit, is slid in the grooves 34 by the rocking movement of the lever 47 and sleeve 49 on the other end of the cross shaft 39 so that the boring tool may be moved through the guide bushing 20 to and from its boring engagement with the work piece W.

The depth gauge 53 will bear against the bracket 59 as a stop peripherally of the shaft 57 upon the return of the motor and boring tool to their starting position remote from the bench 14 and work W.

While the specific details of one embodiment of this invention have been herein shown and described, the invention is not confined thereto as changes and alterations may be made without departing from the spirit and scope thereof as defined in the appended claims.

I claim:

1. An improved boring machine of the kind described comprising a frame, a work bench adjacent one end of said frame, manually actuated clamping lever means pivotally connected to said bench at the other end thereof for clamping a work piece to be bored thereon, lever actuated motor base supports including a pin and inclined slot connection between said frame and said supports for moving said base supports vertically and horizontally relative to said frame, a motor base horizontally slidable on said motor base supports for sliding movement longitudinally of said frame and a link and lever connection connected to said motor base for sliding said motor base.

2. An improved boring machine of the kind described comprising a hollow frame, opposed motor base supports between the opposite side walls of said frame, a pin and inclined slot connection between said motor base supports and said side walls of said frame, a manually actuated lever connection at one end of each of said base motor supports, a motor base slidably mounted between said motor base supports for vertical and horizontal sliding movement of said motor base, and a lever and link actuating means on one end of said motor base for sliding said motor base longitudinally of said frame.

References Cited in the file of this patent

UNITED STATES PATENTS

| | | |
|---|---|---|
| 579,037 | Bulock et al. | Mar. 16, 1897 |
| 1,587,261 | White | June 1, 1926 |
| 2,678,572 | Guenu et al. | May 18, 1954 |